UNITED STATES PATENT OFFICE.

JAMES NAPIER, OF SHACKLEWELL, ENGLAND.

IMPROVEMENT IN THE PROCESS OF REDUCING COPPER ORES.

Specification forming part of Letters Patent No. 5,140, dated June 5, 1847.

*To all whom it may concern:*

Be it known that I, JAMES NAPIER, of Shacklewell, in the county of Middlesex, operative chemist, a subject of the Queen of Great Britain, have invented or discovered new and useful Improvements in Smelting Copper Ores; and I, the said JAMES NAPIER, do hereby declare that the nature of my said invention and in what manner the same is to be performed are fully described and ascertained in and by the following statement thereof—that is to say:

The object of my invention is to facilitate the smelting of copper ores; and it consists in the application of iron with alkaline substances to the smelting such ores and the decomposing and disintegrating by means of water the products obtained by such application.

When I operate upon ores containing less than twenty per cent. of copper and more sulphur than two parts, by weight, to four parts, by weight, of copper, I commence by treating them in the same manner as is usually practiced by smelters—videlicet by first calcining them for about twelve hours in an ordinary calcining-furnace and then removing them to a smelting-furnace, known by smelters as an "ore-furnace," for the purpose of fusing them, adding, if necessary, the usual fluxes. When well fused I skim off the slag and run out the residue either into sand-molds or into water, forming at this point what is technically known as "coarse metal."

When I operate upon ores containing less than twenty per cent. of copper and a smaller proportion of sulphur than two parts, by weight, to four parts, by weight, of copper, I mix with them other ores containing sulphur in larger proportions, so as to make the average proportion of sulphur in the whole reach two parts, by weight, to four parts, by weight, of copper, and proceed to calcine and fuse, as before stated.

When the ores by themselves or by mixture, as aforesaid, with other ores contain a greater proportion of sulphur than one part, by weight, to four parts, by weight, of copper, and also more than twenty per cent. of copper, I omit both the calcining and fusing processes before described, and commence by treating such ores as hereinafter described for treating coarse metal.

I shall designate the product in the first two cases and the ore in the last case as "coarse metal." To every ton-weight of this I add fifty-six pounds of soda-ash (containing about fifty per cent. of alkali) and fifty six pounds of slaked lime, and transfer the whole to a fusing or what is termed by smelters a "metal furnace," and fuse the mass. When the whole is in a state of fusion I skim off any slag which may have formed, and then add one hundredweight of scrap-iron to every ton of the coarse metal, and I disperse the iron over the surface of the melted mass as equally as possible and close the door of the furnace until the whole is melted. I then stir the whole well and rapidly with a rabble, and immediately tap the furnace and run the mass into sand-molds. As soon as the mass is sufficiently set to be removed I put it into a shallow pit containing water enough to cover the whole, and allow it to remain therein from two to three hours, by which time the mass will have become partially decomposed and disintegrated. I then run off the excess of water, remove the mass, and allow it to remain in a heap in the moist state until the whole becomes reduced into a fine powder, which I have generally found to take about twenty-four hours. I then wash this powder by any convenient means. I have succeeded well by using a large box having a double perforated bottom of wood. Between the perforated boards is placed a metallic gauze-wire of from twenty-five to thirty-five meshes to the inch. I place this box in what is known by smelters as a "tapping-pit" of water, having first provided a vent from the pit below the level of the bottom of the box. Over the aperture of this vent is a metallic gauze of from sixty to seventy meshes to the inch. I then introduce a quantity of the powder to be washed into the box, and, having stopped the vent, I pour water in until the box is full. I then open the vent and allow the water to run off. I repeat this process twice. I now remove the powder to an ordinary calcining-furnace, and I apply heat very moderately at first, increasing it gradually for twenty hours, so as that at the end of this time it should reach a bright yellow heat. This yellow heat I continue for six hours longer, taking care to stop short of such a heat as would cake or fuse the powder, and I keep the powder regularly stirred at intervals during the whole time. I now remove the powder from the calcining-furnace to a fusing or metal furnace, taking the precaution to sprinkle it with water when drawn from the calcining-furnace, as is usually practiced, and to every ton-weight of this powder I add in the fusing-furnace about one hundred-weight of anthracite coal, also in powder, and ten pounds of sand, adding, if I find it difficult to fuse, lime or fluor spars a flux. When the whole is well fused I skim off the slag and tap the furnace into sand. The product thus run out I have generally found to be fit for the refining-furnace, and I subsequently refine it in the usual manner; but if, as in practice will sometimes happen, a small portion of the product should be regulus, this regulus, which is rich in copper, I wash, and afterward refine. The slag skimmed off as above contains copper, and may be employed, as usual, with charges in the ore-furnace as a flux.

I have thus described as accurately as I am able the method I prefer to carry out my improvements in smelting copper ores; but I wish it to be understood that I do not confine myself to the details thereof, as the proportions of the ingredients, the mode in which and the stage at which the iron and alkaline substances are added, and the duration of the processes may be varied. I have found potash and its carbonates to produce a similar effect to soda and its carbonates; but

What I claim is—

The application of iron with alkaline substances to the smelting of copper ores, and the decomposing and disintegrating by means of water the product obtained by such application.

JAMES NAPIER.

Witnesses:
  W. H. Z. RITCHIE,
    *Of Lincoln's Inn.*
  JOSEPH MARQUETTE,
*Clerk in the Consulate of the United States, London.*